United States Patent
Bigaj et al.

(10) Patent No.: US 11,593,388 B2
(45) Date of Patent: Feb. 28, 2023

(54) INDEXING BASED ON FEATURE IMPORTANCE

(71) Applicant: International Business Machines Corporation, Armonk, NY (US)

(72) Inventors: Rafal Bigaj, Cracow (PL); Lukasz G. Cmielowski, Cracow (PL); Wojciech Sobala, Cracow (PL); Maksymilian Erazmus, Zasów (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/206,335

(22) Filed: Mar. 19, 2021

(65) Prior Publication Data
US 2022/0300518 A1  Sep. 22, 2022

(51) Int. Cl.
*G06F 16/22* (2019.01)
*G06F 16/242* (2019.01)
*G06F 16/2457* (2019.01)
*G06K 9/62* (2022.01)
*G06N 20/00* (2019.01)

(52) U.S. Cl.
CPC ...... *G06F 16/24578* (2019.01); *G06F 16/221* (2019.01); *G06F 16/2282* (2019.01); *G06F 16/244* (2019.01); *G06F 16/24575* (2019.01); *G06K 9/6232* (2013.01); *G06N 20/00* (2019.01)

(58) Field of Classification Search
CPC ............ G06F 16/24578; G06F 16/221; G06F 16/2282; G06F 16/244; G06F 16/24575; G06K 9/6232; G06N 20/00
See application file for complete search history.

(56) References Cited

U.S. PATENT DOCUMENTS

| | | | | |
|---|---|---|---|---|
| 10,459,927 | B1* | 10/2019 | Gregory | H04N 21/2187 |
| 10,572,925 | B1* | 2/2020 | Roy Chowdhury | G06F 16/24578 |
| 11,275,733 | B1* | 3/2022 | Batsakis | G06F 16/24539 |
| 2012/0150867 | A1* | 6/2012 | Contractor | G06F 16/319 707/742 |

(Continued)

FOREIGN PATENT DOCUMENTS

WO  2020082865 A1  4/2020

OTHER PUBLICATIONS

D. Sisiaridis et al, "Feature Extraction and Feature Selection: Reducing Data Complexity with Apache Spark," International Journal of Network Security & Its Applications (IJNSA) vol. 9, No. 6, Nov. 2017, pp. 39-51.

*Primary Examiner* — Jorge A Casanova
(74) *Attorney, Agent, or Firm* — Grant Johnson; Nicholas D. Bowman

(57) ABSTRACT

A method and a computer program product are used generating an index of a scoring payload dataset. Correlation coefficients for correlations between input data values and output data values of the machine learning model provided by the scoring payload datasets as well as performance data values of the processes provided by process datasets are calculated. Features of which feature values are used as input data values are ranked according to their importance using the correlation coefficients. For the features of a set of highest-ranking features feature value sets with feature values of the respective features are selected from the scoring payload datasets and a database index of the selected feature value sets is generated.

20 Claims, 5 Drawing Sheets

(56) References Cited

U.S. PATENT DOCUMENTS

| | | | |
|---|---|---|---|
| 2014/0280183 A1* | 9/2014 | Brown | G06F 16/2228 |
| | | | 707/741 |
| 2017/0372232 A1 | 12/2017 | Maughan | |
| 2019/0102692 A1* | 4/2019 | Kwant | G06N 20/00 |
| 2019/0188212 A1* | 6/2019 | Miller | G06N 20/00 |
| 2020/0193351 A1 | 6/2020 | Patel | |
| 2022/0076164 A1* | 3/2022 | Conort | G06N 20/00 |

* cited by examiner

| | F1 | F2 | F3 | F4 | F5 | F6 | F7 | F8 | F9 | F10 | ... |
|---|---|---|---|---|---|---|---|---|---|---|---|
| | 0 | less_0 | 20 | prior payments delayed | vacation | 6954 | Less_100 | less_1 | 3 | 70,000 | ... |
| | 0 | no checking | 4 | credits payed to date | car_used | 250 | Less_100 | 1_to_4 | 3 | 50,000 | ... |
| | 0 | no checking | 40 | all credits paid back | other | 250 | 100_to_500 | unemployed | 2 | 10,000 | ... |

| FM-6 | FM-5 | FM-4 | FM-3 | FM-2 | FM-1 | FM | R1 | R2 | R3 | ... |
|---|---|---|---|---|---|---|---|---|---|---|
| 0.0 | 3.0 | 6.0 | 1.0 | 0.0 | 1.0 | 1.0 | 0.0 | no risk | 0.670711 | ... |
| 0.0 | 0.0 | 2.0 | 0.0 | 0.0 | 0.0 | 1.0 | 0.0 | no risk | 0.788291 | ... |
| 0.0 | 0.0 | 10.0 | 0.0 | 1.0 | 0.0 | 1.0 | 1.0 | risk | 0.530031 | ... |

FIG. 2

|    | F1 | F2 | F3 | F4 | F5 | F6 | F7 | F8 | F9 | F10 | ... |
|----|----|----|----|----|----|----|----|----|----|----|----|
| F1 | 1.000000 | -0.150668 | -0.391553 | -0.446102 | -0.012507 | 0.007499 | -0.032562 | 0.016226 | -0.000618 | 0.024043 | ... |
| F2 | -0.150668 | 1.000000 | -0.175536 | -0.199990 | -0.017117 | 0.049392 | -0.019942 | -0.015572 | -0.014854 | -0.002382 | ... |
| F3 | -0.391553 | -0.175536 | 1.000000 | -0.519732 | -0.014683 | -0.052765 | 0.024916 | 0.033860 | 0.025768 | 0.032950 | ... |
| F4 | -0.446102 | -0.199990 | -0.519732 | 1.000000 | 0.033940 | 0.019025 | 0.015366 | -0.039218 | -0.016691 | -0.052006 | ... |
| F5 | -0.012507 | -0.017117 | -0.014683 | 0.033940 | 1.000000 | -0.278156 | -0.067858 | -0.212968 | -0.305450 | 0.026122 | ... |
| ... | ... | ... | ... | ... | ... | ... | ... | ... | ... | ... | ... |

220

|    | FM-8 | FM-7 | FM-6 | FM-5 | FM-4 | FM-3 | FM-2 | FM-1 | FM | K1 |
|----|------|------|------|------|------|------|------|------|----|----|
| F1 | -0.055873 | 0.016420 | NaN | 0.013120 | -0.001984 | -0.015143 | -0.027166 | 0.012442 | 0.057792 | 0.016214 |
| F2 | 0.035693 | -0.028177 | NaN | 0.015358 | 0.033421 | -0.018165 | 0.009744 | -0.028030 | 0.033533 | 0.011561 |
| F3 | -0.007160 | -0.013934 | NaN | 0.010627 | -0.016967 | 0.001724 | 0.008338 | -0.013866 | -0.053785 | 0.009221 |
| F4 | 0.039052 | 0.012824 | NaN | 0.029713 | 0.001229 | 0.021091 | 0.011478 | 0.016256 | -0.017159 | 0.518742 |
| F5 | 0.061802 | -0.031764 | NaN | 0.032138 | -0.028993 | 0.662145 | -0.053867 | -0.014465 | 0.007243 | 0.423917 |
| ... | ... | ... | ... | ... | ... | ... | ... | ... | ... | ... |

FIG. 4

INDEXING BASED ON FEATURE IMPORTANCE

BACKGROUND

The present disclosure generally relates to the field of machine learning and, more specifically, to selecting feature value sets from a set of scoring payload datasets of a machine learning model for indexing.

Machine learning models often lack transparency, acting as a kind of black box. Thus, a machine model may present a result in form of an output; but without proper means to understand and explain the processing of input by the machine learning model, it may be difficult to assess the quality of the output. It may even be difficult to ensure that the machine learning model is indeed doing what it should have been trained for in a suitable way.

SUMMARY

According to an embodiment of the present disclosure, a method for selecting feature value sets from a set of scoring payload datasets of a machine learning model for indexing is provided. The scoring payload datasets are assigned to processes of a plurality of processes. The machine learning model is trained to predict process results for the processes of the plurality of processes. The scoring payload datasets comprise first sets of first feature values provided to the machine learning model as input data values for predicting process results of the processes to which the scoring payload datasets are assigned. The first feature values are assigned to features of a first set of features. The scoring payload datasets further comprise output data values received from the machine learning model as output in response to providing the first sets of first feature values of the scoring payload datasets as input. The output data values of the scoring payload datasets describe the process results predicted for the processes to which the scoring payload datasets are assigned.

The method comprises providing the set of scoring payload datasets. Furthermore, a set of process datasets is provided. The process datasets are assigned to the processes of the plurality of processes. The process datasets comprise performance data values providing performance measures for the processes to which the process datasets are assigned. Provided scoring payload datasets and provided process datasets assigned to the same process are combined to provide a set of combined datasets. Correlation coefficients for correlations between the features of the first set of features and the output data values as well as correlations between the features of the first set of features and the performance data values are calculated using the combined datasets. The features of the first set of features are ranked according to their importance using the correlation coefficients. The higher the features are ranked, the larger the correlation coefficients calculated for the features are. A set of highest-ranking features is selected. For the features of the set of highest-ranking features, feature value sets are selected from the scoring payload datasets. The selected features value sets comprise the feature values of the scoring payload datasets assigned to the features of the set of highest-ranking features. A database index of the selected feature value sets is generated.

According to an embodiment of the present disclosure, a method for generating an index of a scoring payload dataset is provided. One embodiment of the method may comprise providing a set of scoring payload datasets and providing a set of process datasets, the process datasets being assigned to the processes of the plurality of processes, the process datasets comprising performance data values providing performance measures for the processes to which the process datasets are assigned. The method may further comprise combining the provided scoring payload datasets and the provided process datasets assigned to the same process to provide a set of combined datasets. The method may further comprise calculating correlation coefficients for correlations between the features of the first set of features and the output data values. The method may further comprise ranking the features of the first set of features using the correlation coefficients, wherein the higher the features are ranked, the larger the correlation coefficients calculated for the features are. The method may further comprise selecting a set of highest-ranking features. The method may further comprise identifying the features of the set of highest-ranking features feature value sets from the scoring payload datasets, the selected features value sets comprising the feature values of the scoring payload datasets assigned to the features of the set of highest-ranking features. The method may further comprise generating a database index of the identified feature value sets.

According to a further embodiment of the present disclosure, a computer program product for selecting feature value sets from a set of scoring payload datasets of a machine learning model for indexing is provided. The computer program product comprises a computer readable storage medium having program instructions embodied therewith. The scoring payload datasets are assigned to processes of a plurality of processes. The machine learning model is trained to predict process results for the processes of the plurality of processes. The scoring payload datasets comprise first sets of first feature values provided to the machine learning model as input data values for predicting process results of the processes to which the scoring payload datasets are assigned. The first feature values are assigned to features of a first set of features. The scoring payload datasets further comprise output data values received from the machine learning model as output in response to providing the first sets of first feature values of the scoring payload datasets as input. The output data values of the scoring payload datasets describe the process results predicted for the processes to which the scoring payload datasets are assigned.

The program instructions are executable by a processor of a computer system to cause the computer to provide the set of scoring payload datasets. Furthermore, a set of process datasets is provided. The process datasets are assigned to the processes of the plurality of processes. The process datasets comprise performance data values providing performance measures for the processes to which the process datasets are assigned. Provided scoring payload datasets and provided process datasets assigned to the same process are combined to provide a set of combined datasets. Correlation coefficients for correlations between the features of the first set of features and the output data values as well as correlations between the features of the first set of features and the performance data values are calculated using the combined datasets. The features of the first set of features are ranked according to their importance using the correlation coefficients. The higher the features are ranked, the larger the correlation coefficients calculated for the features are. A set of highest-ranking features is selected. For the features of the set of highest-ranking features, feature value sets are selected from the scoring payload datasets. The selected features value sets comprise the feature values of the scoring payload datasets assigned to the features of the set of highest-ranking features. A database index of the selected feature value sets is generated.

According to a further embodiment of the present disclosure, a computer system for selecting feature value sets from a set of scoring payload datasets of a machine learning model for indexing is provided. The scoring payload datasets are assigned to processes of a plurality of processes. The machine learning model is trained to predict process results for the processes of the plurality of processes. The scoring payload datasets comprise first sets of first feature values provided to the machine learning model as input data values for predicting process results of the processes to which the scoring payload datasets are assigned. The first feature values are assigned to features of a first set of features. The scoring payload datasets further comprise output data values received from the machine learning model as output in response to providing the first sets of first feature values of the scoring payload datasets as input. The output data values of the scoring payload datasets describe the process results predicted for the processes to which the scoring payload datasets are assigned.

The computer system comprises a processor and a memory storing program instructions executable by the processor. Execution of the program instructions by the processor causes the computer system to provide the set of scoring payload datasets. Furthermore, a set of process datasets is provided. The process datasets are assigned to the processes of the plurality of processes. The process datasets comprise performance data values providing performance measures for the processes to which the process datasets are assigned. Provided scoring payload datasets and provided process datasets assigned to the same process are combined to provide a set of combined datasets. Correlation coefficients for correlations between the features of the first set of features and the output data values as well as correlations between the features of the first set of features and the performance data values are calculated using the combined datasets. The features of the first set of features are ranked according to their importance using the correlation coefficients. The higher the features are ranked, the larger the correlation coefficients calculated for the features are. A set of highest-ranking features is selected. For the features of the set of highest-ranking features, feature value sets are selected from the scoring payload datasets. The selected features value sets comprise the feature values of the scoring payload datasets assigned to the features of the set of highest-ranking features. A database index of the selected feature value sets is generated.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2 depicts an example set of scoring payload datasets, according to some embodiments.

FIG. 4 depicts an example coefficient matrix, according to some embodiments.

Figure 1:
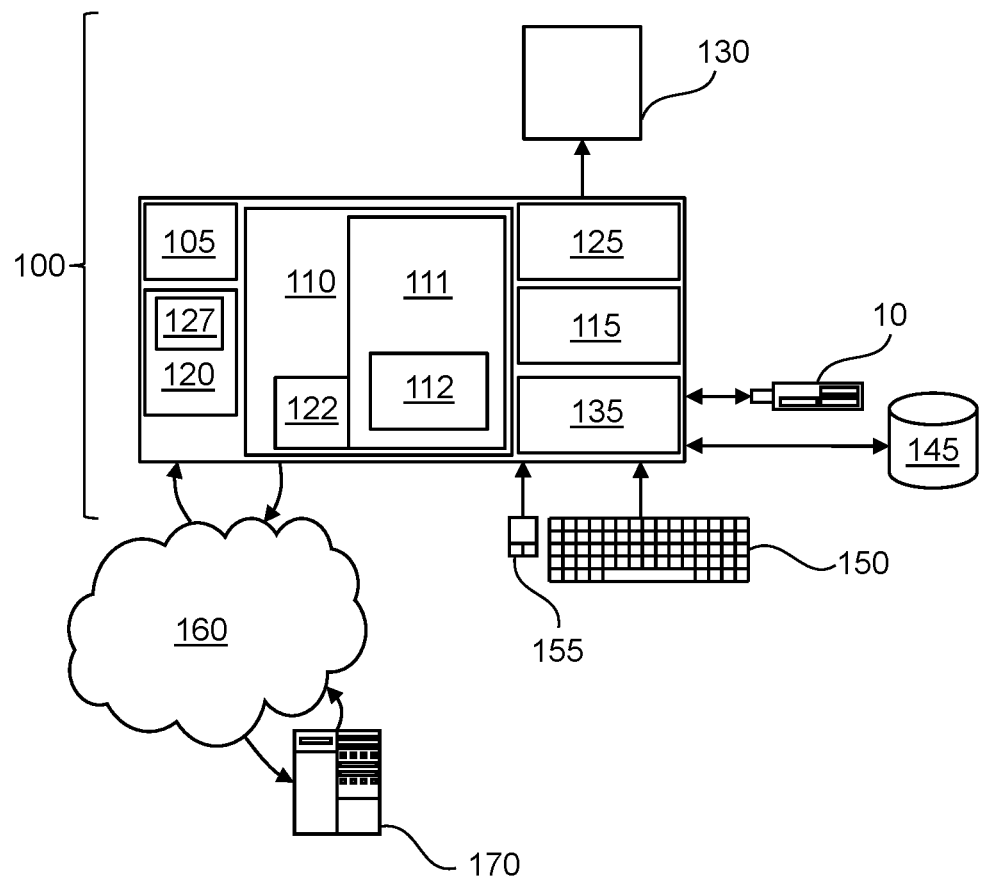
FIG. 1 depicts a schematic diagram illustrating an example computer system, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to help explain the principles of the embodiments, the practical application or technical improvement over technologies found in the marketplace, or to enable others of ordinary skill in the art to understand the embodiments disclosed herein.

Embodiments may have the beneficial effect of providing an efficient and effective approach enabling, analyzing, and explaining a machine learning model. Machine learning models often lack transparency making it difficult to assess the quality of their output. A machine learning model may receive feature values of a large number of features as input and provide predictions in response as output. The machine learning model may, e.g., predict a result of a process. Such a prediction may for example comprise a quantitative and/or qualitative value defining the result. Furthermore, the prediction may comprise a probability for the predicted value. Due to the large number of possible dependencies between the features and the prediction, explaining the machine learning model and its processing of the feature values may be challenging. For example, a large number of feature values, also referred to as a feature vector, of a large number of features may be provided as input to a machine learning model. Such a feature vector may, e.g., comprise a few hundred or even a few thousand feature values, i.e., columns.

Embodiments provide an improvement or optimization of payload data, e.g., for an analytics system, based on feature importance. The feature value sets, e.g., feature value columns, of the payload data may selectively be indexed based on their importance, i.e., their correlation with predicted process results and performance data values. The indexed feature value sets may be used to further analyze the scoring payload datasets and the application of the machine learning model, i.e., the data processing executed by the machine learning model. Embodiments may provide output to enable better understanding of how the machine learning model processes input, thus enabling assessing the quality of the machine learning model and the resulting output. In this way, some embodiment may increase confidence that the machine learning model is indeed doing what it has been trained for in a suitable way.

Such an approach may also enable implementing an explainability for the machine learning model. In order to be able to check and control a proper usage and application of machine learning models, explainability may be a necessary requirement in some use cases, i.e., the processes executed by the respective machine learning models need to be understood to comply with various legal and business imperatives. Explainability of a machine learning model's output allows for understanding why the model made the respective predictions as output and not different ones.

Embodiments may support an assessment and consequently acceptance of the algorithmic prescriptions provided. Understanding how machine learning models are actually working may help to better use and apply the respective models. For example, in the context of a security application that ensures the security of business transactions or security of a controlled system (e.g., a computer system, an industrial machine, or industrial plant), it may be useful to be able to ensure and/or document that process results predicted by the machine learning model are accurate and trustworthy.

Embodiments may enable correlating machine learning model outputs with model metrics and performance indicators, like, e.g., business key performance indicators. Performance indicators may be used to assess the performance of processes with results that are predicted by the machine learning model. Such a performance assessment may be used as a basis for decisions regarding usage, application, and configuration of the machine learning model. For example, a performance assessment may provide a basis for decisions regarding investing in the model performance to achieve a high return of investment (ROI) value.

Scoring payload datasets comprising inputs and outputs of machine learning models may be large regarding the number of records and columns storing feature values. Therefore, providing an index for all of the features may not be an optimal solution. Embodiments may provide a more efficient approach for selecting features of scoring payload datasets to be indexed based on feature importance. Thus, a beneficial database index covering the most significant features may be provided in an efficient and effective way.

The feature importance of a feature generally refers to a correlation of the feature with the machine learning model outputs and performance data values, like key performance indicators. The key performance indicators, in turn, may, e.g., be business key performance indicators. Thus, the indexing may, e.g., be restricted to the feature values sets most correlated to the predicted process results and the process performance data values. The feature importance may be used to select those feature columns that require indexing. The feature importance may be calculated at runtime on the scoring payload data in some embodiments, i.e., during application of the machine learning model. In this way, embodiments may have the beneficial effect of covering a plurality of cases, when a user may like to quickly analyze payload data from the perspective of an explanation that user gets for particular predictions.

Scoring payload data may comprise input and output of a machine learning model. The input may comprise a first set of first feature values. These first feature values may be values of input features to be provided as input to the machine learning model. The features may be features of a process for which a result is to be predicted by the machine learning model. The input features may be features such as, for example: "salary", "credit score", etc. The output may comprise a prediction, e.g., a qualitative or quantitative value. It may further provide a probability of the prediction. The output may be provided in form of numerical values.

The process may, for example, be a business transaction, e.g., a credit approval process. The input features in this first illustrative example may comprise features regarding a customer's finances and/or the purpose of the credit. Key performance indicators may, e.g., comprise "credit amount". The process result may, e.g., determine a default risk.

For second illustrative example, the process may be a business transaction, like a recommending process of a product best fitting a customer's needs. The input features in this second illustrative example may comprise features regarding a customer's previous purchases and/or searches. Key performance indicators may, e.g., comprise rating values of products. The process result may, e.g., comprise recommendations of one or more products best fitting the customer's needs.

As a third illustrative example, the process datasets may provide performance data values, like performance indicators. The process datasets may, e.g., comprise business payload data may with business features describing processes in form of transactions as well as key performance indicator values for the respective transactions. Key performance indicators may, e.g., comprise "credit amount". Second feature values may define secondary features of participants' in the business process. Second feature values may, e.g., comprise values for features like "region", "profession", etc.

As a fourth illustrative example, the process may be a technical process like a monitoring process of a performance and/or function of a system, like a computer system, an infrastructure system, or a manufacturing system. The input features may comprise performance features of the system and/or technical data of the system, like data values defining functions executed. Key performance indicators may, e.g., comprise performance data of the system, damage assessments for defects and/or malfunctions, assessments of counter measurements. The process result may, e.g., comprise future performance data, potential defects, potential malfunctions, and/or recommendations for counter measurements.

As a fifth illustrative example, the process may be a technical process like a controlling a system executing a physical and/or chemical production process. The system may, e.g., be an industrial machine or industrial plant. The input features may comprise control parameters of the system and/or features characterizing feed material used the production. Key performance indicators may, e.g., comprise quality definitions of the end product. The process result may, e.g., comprise recommendations for adjustments of control parameters and/or features of the end product. Second feature values may define secondary features of the devices involved in the technical process.

Processes may be identified by process IDs, e.g., transaction IDs, system IDs, function ID, or user IDs. Such process IDs may be used to identify scoring payload datasets and provided process datasets assigned to the same process, which are to be combined.

Embodiments may enable a selecting of feature value sets based on importance of the respective features. Feature importance in this context is based on a degree of dependence between the predictions of the process results by the machine learning model, e.g., the machine learning model output, and the features, e.g., the machine learning model input. The larger a dependence of a predicted process result on a feature is, the larger the importance of and/or significance of that feature may be. Thus, based on feature importance those feature which may have the largest influence on the predicted process results can be identified and selected for indexing. These features may provide insight on the machine learning model's weighting and processing of feature values provided as input, when generating predictions. Based on this insight explanations of the machine learning model, its processing of data and generation of predictions may be provided.

For determining the feature importance and/or significance, e.g., the dependence between feature values provided as input and predicted process results received as output, correlation coefficients are used. Correlation coefficients (corr(X, Y)) may provide a measure for a dependence between two variables X, Y, which may indicate a predictive relationship between those variables that can be exploited for further analysis. Correlation, in turn, generally refers to a measure of how two or more variables are related to one another. For example, and not by way of limitation, Pearson product-moment correlation coefficients may be used, e.g., sample correlation coefficients may be calculated, or a rank correlation coefficient may be used.

Embodiments may have the further beneficial effect that in addition to the dependence between feature values provided as input and predicted process results received as output, a dependence of the between feature values and performance data values measuring a performance of the process for which the machine learning model predicts process results. Thus, not only features may be identified that have the largest influence on the predicted process results, but also features that have the largest influence on the performance of the process. Feature importance in this context in addition takes into account the influence of the feature on the process performance.

Embodiments may enable the identification of features having the largest influence on the prediction of process results by the machine learning model, e.g., features that are given larger weights, as well as features that have the largest influence on the process performance.

For example, the features of the first set of features may be ranked by ranking the correlation coefficients. Those features with the largest correlation coefficients may be ranked highest, irrespective of whether the correlation coefficients quantify correlations with output data values of the machine learning model, i.e., predicted process results, or whether the correlation coefficients quantify correlations with the performance data values. For ranking the correlation coefficients, e.g., absolute values of the correlation coefficients may be used. This may enable the checking of whether the features with the largest influence on the performance of the processes are also taken into account with a significant weight for the prediction of process results by the machine learning model. For example, such a check may be used to improve the quality of the predictions by the machine learning model and to better understand the processes executed by the machine learning model. The quality of the predictions may be improved by improving the accuracy of the predictions or by ensuring that accurate predictions are based on suitable features actually influencing the process performance. In case there are features with large influence on the processes under consideration, but given no significant weighting by the machine learning model for its predictions, it may be analyzed whether the machine learning model has to be amended, e.g., re-trained, to take the respective features into account sufficiently. In case there are features with large influence on the predictions of the machine learning model, which have no or only a minor influence on the process performance, it may be analyzed whether the machine learning model has to be amended, e.g., re-trained, to reduce the influence of the respective features on the prediction.

To better understand and provide an explanation for the predictions provided by the machine learning model, features with large influence on the predictions of the machine learning model, as well as features with large influence on the performance of the processes under consideration, may be analyzed in more detail. For such a data analysis, an index indexing the feature value set with feature values of the highest-ranking features, e.g., most important and/or significant features, may be used. Indexing only the feature value sets of the highest-ranking features may have the beneficial effect of reducing the amount of data to be indexed by focusing on the most relevant data. Thus, an index may be generated at runtime, i.e., while the machine learning model provides predictions. In other words, the predictions provided by the machine learning model may be analyzed on-the-fly, even in case large numbers of feature values are used as input data. However, some embodiments may use and/or also use asynchronous indexing. One beneficial feature of indexing the scoring payload datasets partially, i.e., important and/or significant features only, is that it may allow for the avoidance of costly and time-consuming payload analytics.

For example, the selected set of highest-ranking features may comprise a pre-defined number of feature or a pre-defined percentage of the total number of features.

According to embodiments, the features of the first set of features may be ranked by ranking combinations of correlation coefficients. For example, for each of the features, a combination of the correlation coefficient for the correlation with the predicted process results and the correlation coefficient for the correlation with the performance values of the respective process may be generated. For example, an averaged correlation coefficient may be calculated. The correlation coefficients of the different correlations may be weighted identically or differently.

According to some embodiments, all features of the first set of features may be taken into account for the ranking. According to other embodiments, only features of the first set of features may be taken into account with a correlation coefficient for the correlation with the predicted process results exceeding a threshold or with a correlation coefficient for the correlation with the performance values of the respective process exceeding a threshold.

For example, the performance data values may be performance indicators, e.g., key performance indicators. Such performance indicators may provide important and/or critical performance measures. A performance indicator, e.g., a key performance indicator (KPI), may provide a performance measurement for a business or a technical process. KPIs may evaluate the success of a process executed by or within an organization, a system or apparatus. Success may, for example, be defined as a repeated, periodic, or a constant achievement of some levels of operational target. Additionally or alternatively, success may be defined in terms of making progress toward an operational target.

The term "machine learning" (ML) generally refers to a computer algorithm used to extract useful information from training datasets by building probabilistic models, referred to as machine learning models or "predictive models", in an automated way. The information may be extracted by building probabilistic models in an automated or semi-automated way. Machine learning algorithms may build a mathematical model based on sample data, known as "training data", in order to, e.g., make predictions without being explicitly programmed to perform the task. The machine learning may be performed using a learning algorithm such as supervised or unsupervised learning, reinforcement algorithm, self-learning, etc. The machine learning may be based on various techniques such as clustering, classification, linear regression, backpropagation, K-means, support vector machines, neural networks, etc. A "model" or "predictive model" may, for example, comprise a data structure or program, such as a neuronal network, a convolutional neuronal network, and/or a radial basis function network. It may comprise a support vector machine, a decision tree, a Bayesian network etc. The model may be adapted to predict as output unmeasured values from other, known values provided as input and/or to predict or select an action to maximize a future reward. According to one example, the machine learning model is a deep learning model.

The machine learning model may be configured to generate output datasets each on the basis of one corresponding input dataset of a set of input datasets. Each output dataset may comprise a single output value or several output values, depending on a use case of the machine learning model. The input datasets and the output datasets may comprise values, e.g., real values, as data elements. The machine learning model may perform a calculation of each output dataset dependent on the corresponding input dataset and on values of parameters of the machine learning model. During the usage, the machine learning model may be in a trained state.

The machine learning model may be generated, also referred to as trained, on the basis of training datasets using machine learning. Each training dataset may comprise an input dataset and an output dataset. Analogously to the input datasets and the output datasets mentioned above, the input datasets and the output datasets of the training datasets may comprise values, e.g., real values, as data elements.

In the trained state, the machine learning model may be used to generate output datasets each in response to one of the provided input datasets. The input datasets may comprise feature values of process features, e.g., each of the feature values may provide a value, e.g., a real value, of a feature of a process. The output datasets may comprise process results predicted for the process. The input datasets may be provided by a user sending the input datasets to the machine learning model. Providing the input datasets for generating the output datasets may be referred to as an application of the machine learning model.

The providing of the set of scoring payload datasets may comprise generating the scoring payload datasets using the trained machine learning model. For example, the trained machine learning model configured for making a prediction for a process result of a process may be provided. The first sets of first feature values may be provided subsequently as input to the trained machine learning model. Each of the first sets of first feature values may be assigned to a process of a plurality of processes for which a process result is to be predicted. For each of the provided first sets of first feature values, in response to the providing, a prediction of a process result may be received from the trained machine learning model for the process to which the receptive first set of first feature values is assigned. The received process results may be added to the first set of first feature values for which they have been received as an output from the trained machine leaning model. Each combination of a first set of first feature values provided as input to the machine learning model and the process results received as output from the trained machine learning model in response to the input may be provided as a scoring payload dataset. Thus, a set of scoring payload datasets comprising a plurality of scoring payload datasets may be provided for a plurality of processes.

The providing of the trained machine learning model may comprise a training of an untrained machine learning model. For the purpose of training, the untrained model may be provided. The training of the untrained machine learning model may comprise providing training datasets. The training datasets may comprise training sets of training feature values of processes. The training feature values may be assigned to features of a set of features. The training datasets may further comprise training data values defining training process results of the respective processes.

The untrained machine learning model may be trained using the training datasets. The training may comprise generating the trained machine learning model by training the untrained machine learning model to receive the training sets as training input and to provide the training process results as training an output(s) in response to receiving the training input.

A database index of the selected feature value sets may improve the speed of data retrieval operations from the selected feature value sets for further analysis. For example, the feature value sets may be stored in a database table, e.g., in form of feature columns. Such a database index may be a data structure that improves the speed of data retrieval operations on a database table at the cost of additional writes and storage space to maintain the index data structure. The index may be used to quickly locate feature data values without having to search every row in a database table every time a database table is accessed. The index may be created using one or more columns of a database table, providing the basis for both rapid random lookups and efficient access of ordered records.

Generating the database index of the selected feature value sets may comprise copying feature columns of the selected highest-ranking features columns that can be searched efficiently. The database index may comprise a low-level disk block address or direct link to the complete row of data it was copied from. Indexing may enable a sub-linear time lookup to improve the search performance, as linear search is inefficient for large databases. An index may improve the performance of lookup, e.g., a logarithmic (O(log(N))) lookup performance may be provided.

According to embodiments, the method may be executed at runtime. Embodiments may have the beneficial effect that the execution of the machine learning model does not have to be interrupted for the indexing of the feature values. Because an indexing may be restricted to a selection of feature value, the indexing may be performed efficiently at runtime of the machine learning model and/or an application using the machine learning model and its predictions. Runtime refers a running phase of a program or application, e.g., the phase, in which the code of the program or application is being executed on a central processing unit (CPU) of a computer system as machine code.

According to embodiments, the method may further comprise pre-processing one or more of the following datasets: the scoring payload datasets, the process datasets, and the combined datasets. According to embodiments, the pre-processing may comprise converting non-numerical data values comprised by the combined datasets to numerical data values. Embodiments may have the beneficial effect that even non-numerical data values can be taken into account for the generation of correlation coefficients.

Pre-processing may, e.g., further comprise data cleaning, data transformation and/or data reduction. Data cleaning may comprise inputting missing values, smoothing out noise, resolving inconsistencies, and/or removing outliers in the data. Data transformations may, in addition to the aforementioned converting of non-numerical data values to numerical values, comprise a normalization of the data. Such a normalization may improve the accuracy and/or efficiency of the data processing, e.g., in case distance measurements are used. Data reduction may reduce the data size by dropping out redundant data. Feature selection and feature extraction techniques may be used for this purpose. Data pre-processing may increase the quality of data by filling in missing incomplete data, smoothing noise, and resolving inconsistencies.

According to embodiments, the method may further comprise splitting the set of combined datasets into batches according to a classification of the combined datasets. The batches comprise subsets of the combined datasets with combined datasets assigned to the same class. The calculating of the correlation coefficients, the ranking of the features of the first set of features, the selecting of the set of highest-ranking features, the selecting of the feature value sets, and the generating of the database index may be performed batchwise.

Embodiments may have the beneficial effect that in case of large set of combined datasets with of a large number of processes the splitting may enable an efficient and effective handling due to the smaller size of the batches. Furthermore, considering different classes of combined datasets represented by the different batches, different rankings of the features may be taken into account. For example, for different classes, different features may be the highest-ranking features. Thus, the influence of the features on the predicted process results and on the process performance may be analyzed for different classes independently. For example, correlations may be found in single batch that may not be found in the full data, i.e., the full set of combined datasets.

The classification may, for example, be based on timestamps assigned to the processes and/or combined datasets, based on user defined tags. The classification may, for example, use a clustering algorithm, e.g., a K-mean clustering algorithm. The classification may, for example, be based on formulas defining additional metrics calculated using data values of the combined datasets, such as aggregation formulas.

According to embodiments, the batchwise performance may be executed for a plurality of the batches in parallel. Embodiments may have the beneficial effect that the execution of the method may be parallelized, speeding up the processing of the plurality of batches. Thus, different batches may be processed on different processors and/or computer systems in parallel.

According to embodiments, the batchwise performance may be executed subsequently for one batch after another.

According to embodiments, the first feature values may be used for the classification of the combined datasets.

According to embodiments, the process datasets may further comprise second sets of second feature values. The second feature values are assigned to features of a second set of features characterizing the processes to which the process datasets are assigned. Embodiments may have the beneficial effect of taken into account additional features characterizing the processes, which are not taken into account as input data to the machine learning model. Such features may not influence the process results and/or the process performance, but may be used to differentiate different classes of processes.

According to embodiments, the second feature values may be used for the classification of the combined datasets.

According to embodiments, the correlation coefficients may be calculated as part of a correlation matrix. The correlation matrix may be calculated using the second feature values in addition to the first feature values, the output data values, and the performance data values. The method may further comprise extracting the correlation coefficients for the correlations between the features of the first set of features and the output data values as well as the correlation coefficients for the correlations between the features of the first set of features and the performance data values from the correlation matrix for the ranking of the features of the first set of features.

For example, a full correlation matrix may be calculated for the second feature values as well as the first feature values, the output data values, and the performance data values. Such a correlation matrix may be used to gain a more detailed insight in dependences of the features. Not only correlation coefficients for the correlations between the selected features of the first set of features and the output data values, as well as for the correlations between the selected features of the first set of features and the performance data values, may be provided, but also correlation coefficients for the correlations between the selected features of the first set of features and any other feature of the combined datasets.

The correlation matrix may be an n times n matrix of n variables $X_1, \ldots, X_n$ with the (i,j) entry being the correlation coefficients $corr(X_i, X_j)$ of the correlation between the variables $X_i$ and $X_j$. For example, Pearson product-moment correlation coefficients may be used, e.g., sample correlation coefficients are calculated, or rank correlation coefficients may be used. The variables $X_1, \ldots, X_n$ of the correlation matrix may comprise the features of the first and/or second set of features, the process results, and the performance indicator.

According to embodiments, the method may further comprise displaying the correlation coefficients of the selected set of highest-ranking features. Embodiments may have the beneficial effect that the selection of the selected set of highest-ranking features may be executed automatically and presented for approval and/or consideration by a user. The user, e.g., a data scientist, may use the selection of the selected set of highest-ranking features for a further data analysis in more detail. For this purpose, the database index of the selected feature value sets may be used.

According to embodiments, the method may further comprise storing the correlation coefficients of the selected set of highest-ranking features. Embodiments may have the beneficial effect that the correlation coefficients may be used for further analyzing the highest-ranking features and their influence on the predicted process results and/or the process performance.

According to embodiments, the database index may further index the correlation coefficients of the selected set of highest-ranking features. Embodiments may have the beneficial effect of enabling efficient index searches additionally taking into account the correlations coefficients.

According to embodiments, the method may further comprise executing a data analysis with the selected feature value sets. The data analysis may comprise executing one or more searches using the database index. Embodiments may have the beneficial effect of enabling efficient searches within the selected feature value sets. For example, specific feature values or feature values within specific ranges may be searched.

For example, the computer program product may comprise program instructions executable by the processor of the computer system configured to implement any of the embodiments of the method for selecting feature value sets from a set of scoring payload datasets of a machine learning model for indexing described herein.

For example, the computer system may be configured to execute any of the embodiments of the method for selecting feature value sets from a set of scoring payload datasets of a machine learning model for indexing described herein.

FIG. 1 shows an example computer system 100 configured for selecting feature value sets from a set of scoring payload datasets of a machine learning model for indexing. The computer system 100 in FIG. 1 may be any type of computerized system comprising a plurality of plurality of processor chips, a plurality of memory buffer chips, and a memory. The computer system 100 may, for example, be implemented in form of a general-purpose digital computer, such as a personal computer, a workstation, or a minicomputer. The computer system 100 may, for example, be implemented in the form of a server.

In example embodiments, in terms of hardware architecture, as shown in FIG. 1, the computer system 100 may include a processor 105, memory (main memory) 110 coupled to a memory controller 115, and one or more input and/or output (I/O) devices (or peripherals) 10, 145 that are communicatively coupled via a local input/output controller 135. The input/output controller 135 may be, but is not limited to, one or more buses or other wired or wireless connections, as is known in the art. The input/output controller 135 may have additional elements (which are omitted in FIG. 1 for clarity), such as controllers, buffers (caches), drivers, repeaters, and receivers, to enable communications. Further, the local interface may include address, control, and/or data connections to enable appropriate communications among the aforementioned components.

The processor 105 may be a hardware device for executing software, particularly that stored in memory 110. The processor 105 may be any custom made or commercially available processor, a central processing unit (CPU), an auxiliary processor among several processors associated with the computer system 100, a semiconductor-based microprocessor (in the form of a microchip or chip set), a macroprocessor, or generally any device for executing software instructions.

The memory 110 may include any one or combination of volatile memory modules (e.g., random access memory (RAM, such as DRAM, SRAM, SDRAM, etc.)) and non-volatile memory modules (e.g., ROM, erasable programmable read only memory (EPROM), electronically erasable programmable read only memory (EEPROM), or programmable read only memory (PROM)). The memory 110 may have a distributed architecture, where additional modules are situated remote from one another, but may be accessed by the processor 105.

The software in memory 110 may include one or more separate programs, each of which may comprise an ordered listing of executable instructions for implementing logical functions, notably functions involved in embodiments of this disclosure. Executable instructions may for be configured for selecting feature value sets from a set of scoring payload datasets of a trained machine learning model for indexing. The executable instructions may be configured for processing scoring payload datasets and process datasets. The processing may comprise combining the scoring payload datasets and process datasets as well as pre-processing the resulting combined datasets. The executable instructions may be configured for calculating correlation coefficients, e.g., generating a correlation matrix. The executable instructions may be configured for indexing feature values. The executable instructions may further implement the trained machine learning model. The executable instructions may further provide an untrained machine learning model, as well as instructions for training the untrained machine learning model. The executable instructions may further be configured for classifying datasets into batches. The software in memory 110 may further include a suitable operating system (OS) 111. The OS 111 may control the execution of other computer programs, such as possibly software 112.

If the computer system 100 is a PC, workstation, intelligent device or the like, the software in the memory 110 may further include a basic input output system (BIOS) 122. The BIOS may comprise a set of essential software routines that initialize and test hardware at startup, start the OS 111, and support the transfer of data among the hardware devices. The BIOS may be stored in ROM so that the BIOS may be executed when the computer system 100 is activated.

When the computer system 100 is in operation, the processor 105 may be configured for executing software 112 stored within the memory 110, to communicate data to and from the memory 110, and to generally control operations of the computer system 100 pursuant to the software. The methods described herein and the OS 111, in whole or in part, but typically the latter, are read by the processor 105, possibly buffered within the processor 105, and then executed.

Software 112 may further be provided stored on any computer readable medium, such as storage 120, for use by or in connection with any computer related system or method. The storage 120 may comprise a disk storage such as HDD storage. The set of scoring payload datasets and/or the set of process datasets may be stored on the computer system 100 using an internal storage, like storage 120, or a peripheral storage, like storage medium 145. Alternatively or additionally, the set of scoring payload datasets and/or the set of process datasets may be stored on other computer system, like computer system 170, e.g., accessible for the computer system 100 via a network, like network 160.

For example, a conventional keyboard 150 and mouse 155 may be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for example but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 may be any generalized cryptographic card or smart card known in the art. The computer system 100 may further include a display controller 125 coupled to a display 130. For example, the computer system 100 may further include a network interface for coupling to a network 160, like an intranet or the Internet. The network may be an IP-based network for communication between the computer system 100 and any external server, like computer system 170, other client and the like via a broadband connection. The network 160 transmits and receives data between the computer system 100 and computer system 170. For example, network 160 may be a managed IP network administered by a service provider. The network 160 may be implemented in a wireless fashion, e.g., using wireless protocols and technologies, such as Wi-Fi, WiMAX, etc. The network 160 may also be a packet-switched network such as a local area network, wide area network, metropolitan area network, Internet network, or other type of network environment. The network may be a fixed wireless network, a wireless local area network (LAN), a wireless wide area network (WAN) a personal area network (PAN), a virtual private network (VPN), intranet or other suitable network system, and may include equipment for receiving and transmitting signals.

The method of selecting feature value sets for indexing may comprise a pre-processing of the provided scoring payload datasets and process datasets. The scoring payload datasets and process datasets may be combined, e.g., joined, using process IDs and furthermore pre-processed. For the pre-processing a pipeline may be used, e.g., an extract, transform, and load (ETL) pipeline or a machine learning pipeline. An ETL pipeline generally refers to a set of processes extracting data from an input source, transforming the data, and loading into an output destination. A goal of the pipeline may be to convert non-numerical data to numerical ones. The converting may comprise encoding categorical values. The pipeline may comprise further operations required to make the data ready for a correlation coefficients calculation, such as data cleaning, data transformation, and/or data reduction. After the pre-processing, the combined datasets may be available in numerical format.

FIG. 2 shows a set 200 with three example scoring payload datasets 202, 204, 206 of the set full set of scoring payload datasets. In FIG. 2, example feature values for the following features comprised of the scoring payload datasets 202, 204, 206, etc., each comprised of a plurality of data elements 202A, 202B, etc., 204A, 204B, etc., 206A, 206B, etc. (only some labeled for clarity), are shown:
$F_1$=Day,
$F_2$=CheckingStatus,
$F_3$=LoanDuration,
$F_4$=CreditHistory, CheckingStatus_no_checking,
$F_5$=LoanPurpose,
$F_6$=LoanAmount,
$F_7$=ExistingSavings,
$F_8$=EmploymentDuration,
$F_9$=InstallmentPercent,
$F_{10}$=Income,
. . . ,
$F_{M-6}$=InstallmentPlans_IX,
$F_{M-5}$=Job_IX,
$F_{M-4}$=LoanPurpose_IX,
$F_{M-3}$=OthersOnLoan_IX,
$F_{M-2}$=OwnsProperty_IX,
$F_{M-1}$=Income_IX,
$F_M$=Telephone_IX.

Furthermore, the scoring payload datasets 202, 204, 206 may comprise, e.g., the following predicted process results:
$R_1$=Prediction,
$R_2$=PredictedLabel,
$R_3$=Probability.

Figure 3:
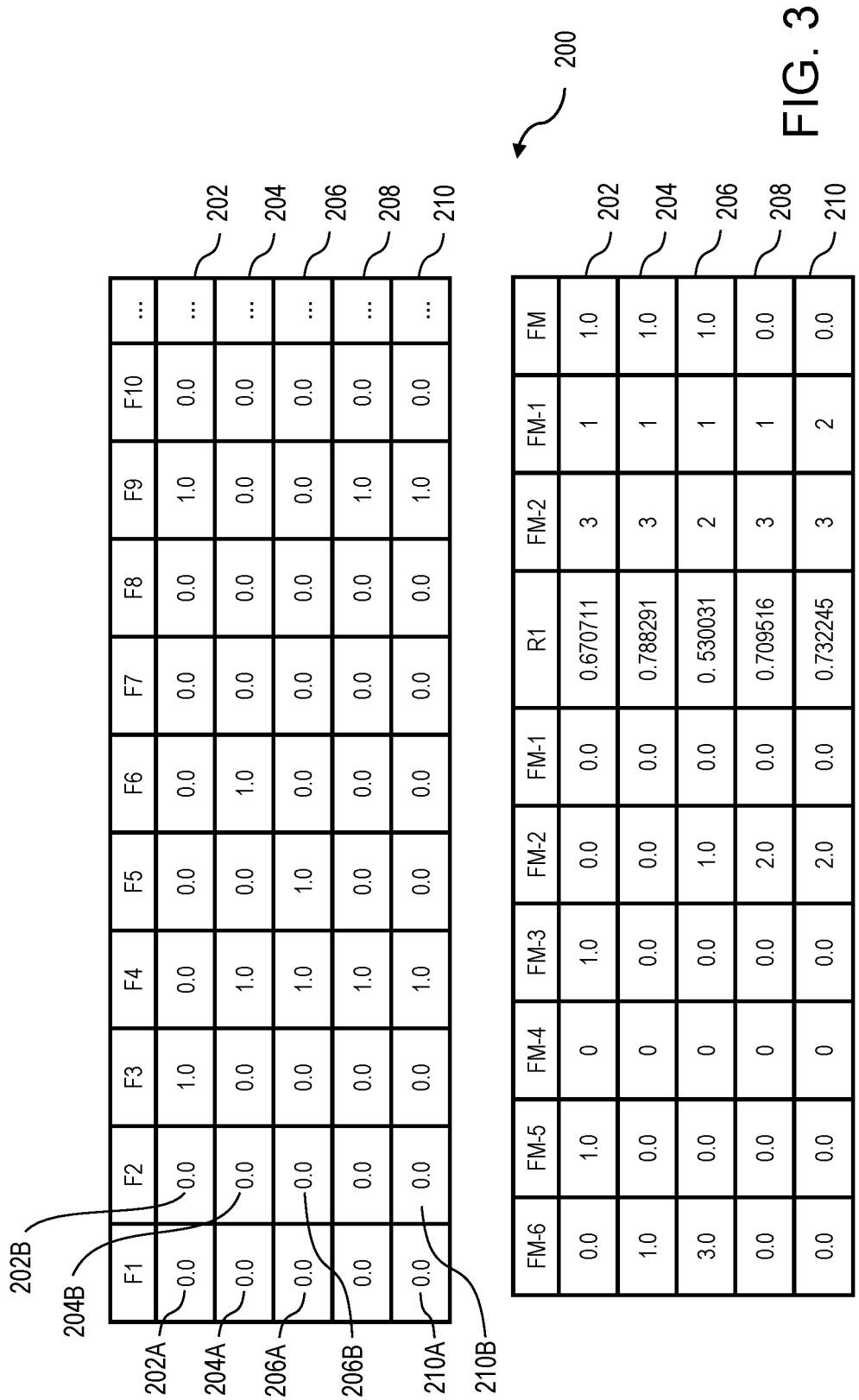
FIG. 3 depicts an example pre-processed set of scoring payload datasets, according to some embodiments.

FIG. 3 shows a set 200 with five example scoring payload datasets 202, 204, 206, 208, 210 of the set full set of scoring payload datasets after pre-processing, each comprised of a plurality of data elements 202A, 202B, etc., . . . 210A, 210B, etc. (only some labeled for clarity). As a result of the pre-processing, the scoring payload datasets 202, 204, 206, 208, 210 are provided in numerical format. In FIG. 2, example feature values for the following features comprised by the scoring payload datasets 202, 204, 206, 208, 210 are shown:
$F_1$=CheckingStatus_0_to_200,
$F_2$=CheckingStatus_greater_200,
$F_3$=CheckingStatus_less_0,
$F_4$=CheckingStatus_no_checking,
$F_5$=CreditHistory_all_credits_paid_back,
$F_6$=CreditHistory_credits_paid_to_date,
$F_7$=CreditHistory_no_credits,
$F_8$=CreditHistory_outstanding_credit,
$F_9$=CreditHistory_prior_payments_delayed,
$F_{10}$=LoanPurpose_appliances,
. . . ,
$F_{M-8}$=CreditHistory_IX,
$F_{M-7}$=OthersOnLoan_IX,
$F_{M-6}$=Day,
$F_{M-5}$=Income_IX,
$F_{M-4}$=OwnsProperty_IX,
$F_{M-3}$=Region_IX,
$F_{M-2}$=InstallmentPercent,
$F_{M-1}$=ExisitingCreditCount,
$F_M$=Telephone_IX.

Furthermore, the following example predicted process result comprised by scoring payload datasets 202, 204, 206, 208, 210 is shown:
$R_1$=Probability.

Scoring payload datasets, e.g., scoring payload datasets 202, 204, 206, 208, 210, are combined with process datasets assigned to the same process. For identifying the processes to which the datasets are assigned, process IDs comprised by the respective datasets may be used. The combining may result in a set of combined datasets. The combining may be executed before or after the pre-processing. The combined datasets may be split, e.g., sliced, into k-batches. The splitting may be performed using one of the following example splitting criteria: timestamps, e.g., hourly, daily, weekly, etc.; user defined tags; a clustering algorithm, e.g., a K-mean clustering; formulas defined for other metrics, like BKPI aggregation formulas. After the splitting the pre-processed data may be provided in form of k-batches. The number k of batches resulting from the splitting may depend on the selected technique. For example, k=7 may be used.

A correlation matrix may be calculated for each of the batches. For each of the batches, the respective correlation matrix may comprise correlation coefficients for all combination of features, such as for correlations with the machine learning model output, e.g., predictions of process results and/or probabilities of the predictions, and performance indicators. The operation may be executed, successively or in parallel, for each of the batches.

FIG. 4 shows a part of an example correlation matrix 220 for a batch, with the following example feature values being shown:
F1=CheckingStatus_0_to_200,
F2=CheckingStatus_greater_200,
F3=CheckingStatus_less_0,
F4=CheckingStatus_no_checking,
F5=CreditHistory_all_credits_paid_back,
F6=CreditHistory_credits_paid_to_date,
F7=CreditHistory_no_credits,
F8=CreditHistory_outstanding_credit,
F9=CreditHistory_prior_payments_delayed,
F10=LoanPurpose_appliances,
. . . ,
FM-8=OthersOnLoan_IX,
FM-7=Income_IX,
FM-6=Day,
FM-5=Region_IX,
FM-4=Creditmix,
FM-3=CreditHistory_IX,
FM-2=InstallmentPercent,
FM-1=Telephone_IX,
FM=OwnsProperty_IX.

Furthermore, correlation values for K1=Credit_Amount as an example KPI is shown. The example correlation matrix 220 shows example correlation values for the correlations with the first five feature values F1 to F5 of the example feature values. In case of N variables, the resulting correlation matrix is an N times N matrix. In case of FIG. 4, e.g., 78 variables may be considered resulting in a correlation matrix comprising 78 rows times 78 columns. Of the 78 rows in this example, 5 rows are shown for clarity.

From this correlation matrix 220, correlation coefficients for correlations with the output of the machine learning model and the performance indicators may be extracted and ranked. For this purpose, the columns or fields representing the output and performance indicators maybe selected. In other words, the correlation information may be filtered for features and output/performance indicators. Next, the selected correlation coefficients may be sorted depending on coefficient values. The higher the coefficient value, the more important and/or significant a particular feature is, in this embodiment. The aforementioned correlation coefficients operation may be performed for each of the batches. Based on the coefficient values, a ranked list of the features may be created, and the top N elements may be selected. N may be a predefined value and, e.g., set according to the amount of data to be handled. For purpose of this example, e.g., N=10 may be used. For the selected features, a database index may be generated. Embodiments may have the beneficial effect of allowing for a significant payload analytics improvement with relatively lower or even minimal cost.

Figure 5:
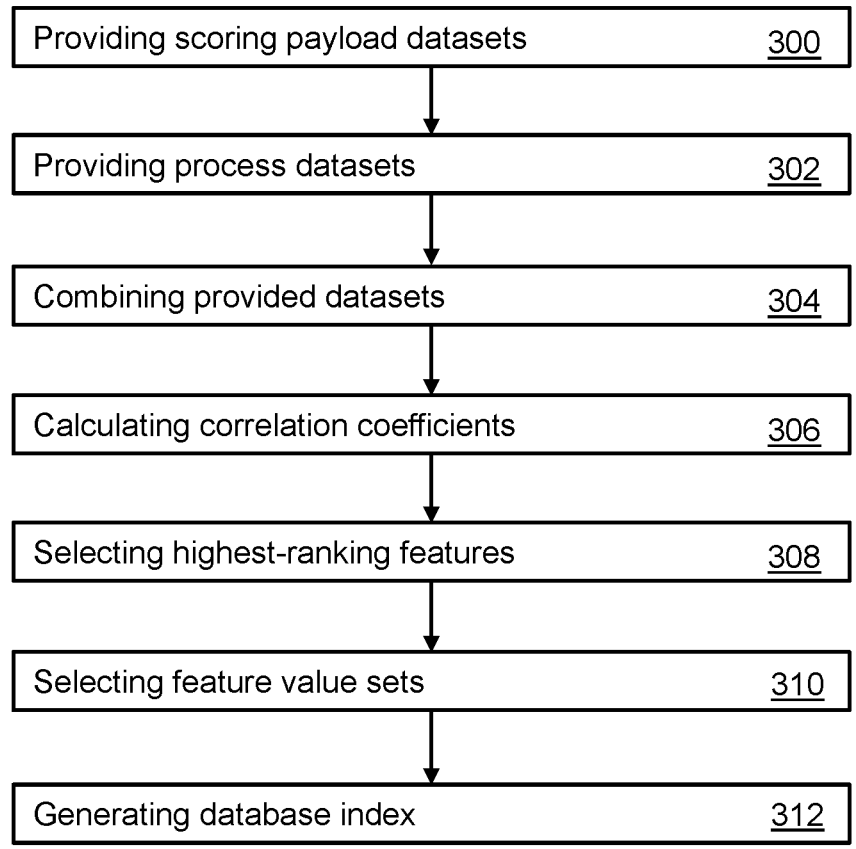
FIG. 5 depicts a schematic flow diagram of an example method, according to some embodiments.

FIG. 5 is a flowchart of an example method for selecting feature value sets from a set of scoring payload datasets of a machine learning model for indexing, consistent with some embodiments. The scoring payload datasets may be assigned to processes of a plurality of processes. The machine learning model may be trained to predict process results for the processes of the plurality of processes. The scoring payload datasets may comprise first sets of first feature values provided to the machine learning model as input data values for predicting process results of the processes to which the scoring payload datasets ae assigned. The first feature values may be assigned to features of a first set of features. The scoring payload datasets further may comprise output data values received from the machine learning model as an output in response to providing the first sets of first feature values of the scoring payload datasets as input. The output data values of the scoring payload datasets may describe the process results predicted for the processes to which the scoring payload datasets are assigned.

In operation 300, the set of scoring payload datasets may be provided. In operation 302, a set of process datasets may be provided. The process datasets may be assigned to the processes of the plurality of processes. The process datasets may comprise performance data values providing performance measures for the processes to which the process datasets are assigned. In operation 304, provided scoring payload datasets and provided process datasets assigned to the same process may be combined to provide a set of combined datasets. The datasets, e.g., the scoring payload datasets provided in operation 300 and/or the process datasets provided in operation 302, may, in addition, be preprocessed before or after the combining. In operation 306, correlation coefficients for correlations between the features of the first set of features and the output data values, as well as correlations between the features of the first set of features and the performance data values, may be calculated using the combined datasets. In operation 308, the features of the first set of features may be ranked according to their importance and/or significance using the correlation coefficients. The features are ranked the higher, the larger the correlation coefficients calculated for the features are, in some embodiments. The ranking of the features of the first set of features may be used to select a set of highest-ranking features. In operation 310, for the features of the set of highest-ranking features feature value sets may be selected from the scoring payload datasets. The selected features value sets may comprise the feature values of the scoring payload datasets assigned to features of the set of highest-ranking features. In operation 312, a database index of the selected feature value sets may be generated.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as including transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device may receive the computer readable program instructions from the network and may forward the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, such as a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which may comprise one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Therefore, it is desired that the embodiments described herein be considered in all respects as illustrative, not restrictive, and that reference be made to the appended claims for determining the scope of the invention.

What is claimed is:

1. A method for generating an index of a scoring payload dataset, the method com-prising:
   providing a set of scoring payload datasets;
   providing a set of process datasets, the process datasets being assigned to processes of a plurality of processes, the process datasets comprising performance data values providing performance measures for the processes to which the process datasets are assigned;
   combining the provided scoring payload datasets and the provided process datasets assigned to a same process to provide a set of combined datasets;
   calculating correlation coefficients for correlations between higher features of a first set of features and output data values;
   ranking the features of the first set of features using the correlation coefficients, wherein the higher the features are ranked, the larger the correlation coefficients calculated for the features are;
   selecting a set of highest-ranking features;
   identifying the features of the set of highest-ranking features feature value sets from the scoring payload datasets, the selected features value sets comprising the feature values of the scoring payload datasets assigned to the features of the set of highest-ranking features; and
   generating a database index of the identified feature value sets.

2. The method of claim 1, further comprising assigning the scoring payload datasets to processes of the plurality of processes, wherein:
   the method is executed at runtime;
   the machine learning model is trained to predict process results for the processes of the plurality of processes; and
   the scoring payload datasets comprise:
      first sets of first feature values provided to the machine learning model as input data values for predicting process results of the processes to which the scoring payload datasets are assigned, the first feature values being assigned to features of the first set of features; and
      output data values received from the machine learning model as output in response to providing the first sets of first feature values of the scoring payload datasets as input, the output data values of the scoring payload datasets describing the process results predicted for the processes to which the scoring payload datasets are assigned.

3. The method of claim 1:
   further comprising pre-processing a dataset chosen from the group consisting of the scoring payload datasets, the process datasets, and the combined datasets; and
   wherein the pre-processing comprises converting non-numerical data values comprised by the combined datasets to numerical data values.

4. The method of claim 1, further comprising splitting the set of combined datasets into batches according to a classification of the combined datasets, the batches comprising subsets of the combined datasets with combined datasets assigned to a same class, wherein the calculating of the correlation coefficients, the ranking of the features of the first set of features, the selecting of the set of highest-ranking features, the selecting of the feature value sets, and the generating of the database index are performed batchwise.

5. The method of claim 4, wherein the batchwise performance is executed for a plurality of the batches in parallel.

6. The method of claim 4, wherein the batchwise performance is executed subsequently for one batch after another.

7. The method of claim 4, wherein the first feature values are used for the classification of the combined datasets.

8. The method of claim 1, wherein the processed datasets further comprise second sets of second feature values, the second feature values being assigned to features of a second set of features characterizing the processes to which the process datasets are assigned.

9. The method of claim 8, wherein the second feature values are used for the classification of the combined datasets.

10. The method of claim 1:
wherein the correlation coefficients are further calculated for correlations between the features of the first set of features and the performance data values using the combined datasets;
wherein the correlation coefficients are calculated as part of a correlation matrix, the correlation matrix being calculated using the second feature values in addition to the first feature values, the output data values, and the performance data values; and
further comprising extracting the correlation coefficients for the correlations between the features of the first set of features and the output data values as well as the correlation coefficients for the correlations between the features of the first set of features and the performance data values from the correlation matrix for the ranking of the features of the first set of features.

11. The method of claim 1, further comprising displaying the correlation coefficients of the selected set of highest-ranking features.

12. The method of claim 1, further comprising storing the correlation coefficients of the selected set of highest-ranking features.

13. The method of claim 1, wherein the database index further indexes the correlation coefficients of the selected set of highest-ranking features.

14. The method of claim 1, further comprising executing a data analysis with the selected feature value sets, the data analysis comprising executing one or more searches using the database index.

15. A computer program product for selecting feature value sets from a set of scoring payload datasets of a machine learning model for indexing, the computer program product com-prising a computer readable storage medium having program instructions embodied therewith,
the scoring payload datasets being assigned to processes of a plurality of processes, the machine learning model being trained to predict process results for the processes of the plurality of processes,
the scoring payload datasets comprising first sets of first feature values provided to the machine learning model as input data values for predicting process results of the processes to which the scoring payload datasets are assigned, the first feature values being assigned to features of a first set of features,
the scoring payload datasets further comprising output data values received from the machine learning model as output in response to providing the first sets of first feature values of the scoring payload datasets as input, the output data values of the scoring payload datasets describing the process results predicted for the processes to which the scoring payload datasets are assigned,
the program instructions being executable by a processor of a computer system to cause the computer system to:
provide the set of scoring payload datasets;
provide a set of process datasets, the process datasets being assigned to the processes of the plurality of processes, the process datasets comprising performance data values providing performance measures for the processes to which the process datasets are assigned;
combine provided scoring payload datasets and provided process datasets assigned to the same process to provide a set of combined datasets;
calculate correlation coefficients for correlations between the features of the first set of features and the output data values as well as correlations between the features of the first set of features and the performance data values using the combined datasets;
rank the features of the first set of features according to their importance using the correlation coefficients, wherein the features are ranked the higher, the larger the correlation coefficients calculated for the features are;
select a set of highest-ranking features;
select for the features of the set of highest-ranking features feature value sets from the scoring payload datasets, the selected features value sets comprising the feature values of the scoring payload datasets assigned to the features of the set of highest-ranking features;
generate a database index of the selected feature value sets.

16. The computer program product of claim 15, the program instructions further being executable to cause the computer system to split the set of combined datasets into batches according to a classification of the combined datasets, the batches comprising subsets of the combined datasets with combined datasets assigned to the same class, wherein the calculating of the correlation coefficients, the ranking of the features of the first set of features, the selecting of the set of highest-ranking features, the selecting of the feature value sets, and the generating of the database index are performed batchwise.

17. The computer program product of claim 15, the process datasets further comprising second sets of second feature values, the second feature values being assigned to features of a second set of features characterizing the processes to which the process datasets are assigned.

18. A computer system for selecting feature value sets from a set of scoring payload datasets of a machine learning model for indexing,
the scoring payload datasets being assigned to processes of a plurality of processes, the machine learning model being trained to predict process results for the processes of the plurality of processes,
the scoring payload datasets comprising first sets of first feature values provided to the machine learning model as input data values for predicting process results of the processes to which the scoring payload datasets are assigned, the first feature values being assigned to features of a first set of features, the scoring payload datasets further comprising output data values received from the machine learning model as output in response to providing the first sets of first feature values of the scoring payload datasets as input, the output data values of the scoring payload datasets describing the process results predicted for the processes to which the scoring payload datasets are assigned, the computer system comprising a processor and a memory storing program instructions executable by the processor, execution of the program instructions by the processor causing the computer system to:

provide the set of scoring payload datasets;

provide a set of process datasets, the process datasets being assigned to the processes of the plurality of processes, the process datasets comprising performance data values providing performance measures for the processes to which the process datasets are assigned;

combine provided scoring payload datasets and provided process datasets assigned to the same process to provide a set of combined datasets;

calculate correlation coefficients for correlations between the features of the first set of features and the output data values as well as correlations between the features of the first set of features and the performance data values using the combined datasets;

rank the features of the first set of features according to their importance using the correlation coefficients, wherein the features are ranked the higher, the larger the correlation coefficients calculated for the features are;

select a set of highest-ranking features;

select for the features of the set of highest-ranking features feature value sets from the scoring payload datasets, the selected features value sets comprising the feature values of the scoring payload datasets assigned to the features of the set of highest-ranking features;

generate a database index of the selected feature value sets.

19. The computer system of claim 18, execution of the program instructions by the processor further causing the computer system to split the set of combined datasets into batches according to a classification of the combined datasets, the batches comprising subsets of the combined datasets with combined datasets assigned to the same class, wherein the calculating of the correlation coefficients, the ranking of the features of the first set of features, the selecting of the set of highest-ranking features, the selecting of the feature value sets, and the generating of the database index are performed batchwise.

20. The computer system of claim 18, the process datasets further comprising second sets of second feature values, the second feature values being assigned to features of a second set of features characterizing the processes to which the process datasets are assigned.

* * * * *